US009686545B2

(12) United States Patent
Lin

(10) Patent No.: US 9,686,545 B2
(45) Date of Patent: Jun. 20, 2017

(54) METHOD AND APPARATUS FOR INTRA-PREDICTION

(71) Applicant: Huawei Technologies Co., Ltd., Shenzhen (CN)

(72) Inventor: Yongbing Lin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 393 days.

(21) Appl. No.: 14/265,795

(22) Filed: Apr. 30, 2014

(65) Prior Publication Data

US 2014/0233642 A1    Aug. 21, 2014

Related U.S. Application Data

(63) Continuation of application No. PCT/CN2012/084277, filed on Nov. 8, 2012.

(30) Foreign Application Priority Data

Nov. 8, 2011 (CN) .......................... 2011 1 0351863

(51) Int. Cl.
*H04N 19/593* (2014.01)
*H04N 19/105* (2014.01)
(Continued)

(52) U.S. Cl.
CPC ..... *H04N 19/00763* (2013.01); *H04N 19/105* (2014.11); *H04N 19/11* (2014.11);
(Continued)

(58) Field of Classification Search
CPC combination set(s) only.
See application file for complete search history.

(56) References Cited

U.S. PATENT DOCUMENTS

2005/0163216 A1* 7/2005 Boon ................... H04N 19/593
375/240.12
2007/0177672 A1* 8/2007 Yang ................... H04N 19/597
375/240.25

(Continued)

FOREIGN PATENT DOCUMENTS

CN    101385356 A    3/2009
CN    101827270 A    9/2010

(Continued)

OTHER PUBLICATIONS

WO 2007/093629 A1—Thoreau et al., Aug. 23, 2007.*

(Continued)

*Primary Examiner* — Sath V Perungavoor
*Assistant Examiner* — Janese Duley
(74) *Attorney, Agent, or Firm* — Conley Rose, P.C.

(57) ABSTRACT

An intra-prediction method is provided to predict a current block according to pixel values of an upper neighboring block and a left neighboring block. The method includes: acquiring, according to a prediction direction, mapped pixels in the left neighboring block for reference pixels in an upper neighboring block; calculating an average pixel value of pixel values of the reference pixels in the upper neighboring block and pixel values of their respective mapped pixels; and predicting, according to the prediction direction, a pixel value of a pixel in the current block by using the average pixel value. By using the method and apparatus for intra-prediction according to the present invention, a pixel value of a reference pixel used for prediction is acquired according to an average pixel value of reference pixels in an upper neighboring block and a left neighboring block of the current block.

18 Claims, 3 Drawing Sheets

(51) Int. Cl.
H04N 19/176 (2014.01)
H04N 19/11 (2014.01)
H04N 19/136 (2014.01)

(52) U.S. Cl.
CPC ......... *H04N 19/136* (2014.11); *H04N 19/176* (2014.11); *H04N 19/593* (2014.11)

(56) References Cited

U.S. PATENT DOCUMENTS

| | | | |
|---|---|---|---|
| 2009/0122864 A1* | 5/2009 | Palfner | H04N 19/176 375/240.12 |
| 2010/0232505 A1* | 9/2010 | Thoreau | H04N 19/105 375/240.16 |
| 2013/0301730 A1 | 11/2013 | Lin et al. | |

FOREIGN PATENT DOCUMENTS

| | | |
|---|---|---|
| CN | 102595120 A | 7/2012 |
| WO | 2011021838 A2 | 2/2011 |
| WO | 2011021839 A2 | 2/2011 |

OTHER PUBLICATIONS

Partial English Translation and Abstract of Chinese Patent Application No. CN101827270A, Jun. 20, 2014, 7 pages.
Foreign Communication From a Counterpart Application, PCT Application No. PCT/CN2012/084277, English Translation of International Search Report dated Feb. 28, 2013, 3 pages.
Foreign Communication From a Counterpart Application, PCT Application No. PCT/CN2012/084277, English Translation of Written Opinion dated Feb. 28, 2013, 9 pages.
"Series H: Audiovisual and Multimedia Systems, Infrastructure of Audiovisual Services—Coding of Moving Video, Advanced Video coding for Generic Audiovisual Services," ITU-T, Telecommunication Standardization Sector of ITU, H.264, Nov. 2007, 564 pages.

* cited by examiner

METHOD AND APPARATUS FOR INTRA-PREDICTION

CROSS-REFERENCE TO RELATED APPLICATIONS

This application is a continuation of International Application No. PCT/CN2012/084277, filed on Nov. 8, 2012, which claims priority to Chinese Patent Application No. 201110351863.X, filed on Nov. 8, 2011, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

Embodiments of the present invention relate to the image processing field, and in particular, to a method and an apparatus for intra-prediction.

BACKGROUND

An intra-prediction technology stipulated in a video coding standard uses a correlation between neighboring blocks and employs multi-direction prediction to improve prediction precision. For example, in H.264, there are nine prediction directions for predicting a luminance component. An intra-prediction technology stipulated in a High Efficiency Video Coding (HEVC) standard draft is similar to an intra-prediction technology used in H.264, but the HEVC further extends a block partitioning type and the number of prediction directions, and a maximum of 33 directions are allowed for prediction. A distribution of prediction directions is illustrated in a figure below. A thick box indicates a current block, each black line indicates a prediction direction, and as shown in the figure, a prediction of a pixel in a bottom-most corner of the current block by using an upper and a left reference pixel may be performed along 33 directions. The directions may be classified into two types: (1) a direction from upper left to lower right, which is defined as a negative angle prediction direction; (2) a direction from upper right to lower left, or a direction from lower left to upper right, which is defined as a positive angle prediction direction. During a prediction process, a prediction mode is selected, and a reference pixel is then acquired according to a prediction direction indicated by the prediction mode, for example, if the prediction direction of the prediction mode points to 90 degrees relative to a current pixel, a pointed-to pixel at a border between an upper neighboring block and the current block is used as a reference pixel of the current pixel according to the prediction direction, and prediction is then performed according to a pixel value of the reference pixel. This, however, is a unidirectional prediction technology, and uses a reference pixel on only one side of a prediction direction to perform prediction, which is difficult to ensure prediction precision.

SUMMARY

The present invention provides an intra-prediction method to predict a current block according to pixel values of an upper neighboring block and a left neighboring block, including: acquiring, according to a prediction direction, mapped pixels in a left neighboring block for reference pixels in an upper neighboring block; calculating an average pixel value of pixel values of the reference pixels in the upper neighboring block and pixel values of their respective mapped pixels; and predicting, according to the prediction direction, a pixel value of a pixel in the current block by using the average pixel value.

The present invention further provides an intra-prediction apparatus, including: a mapping module configured to acquire, according to a prediction direction, mapped pixels in a left neighboring block for reference pixels in an upper neighboring block; a predicted pixel acquiring module configured to calculate an average pixel value of pixel values of the reference pixels in the upper neighboring block and pixel values of their respective mapped pixels; and a prediction module configured to predict, according to the prediction direction, a pixel value of a pixel in the current block by using the average pixel value.

By using the method and apparatus for intra-prediction according to the present invention, a pixel value of a reference pixel used for prediction is acquired according to an average pixel value of reference pixels in an upper neighboring block and a left neighboring block of the current block, so as to fully consider a spatial distribution feature of a pixel, and achieve a better prediction effect compared with the prior art.

BRIEF DESCRIPTION OF THE DRAWINGS

To illustrate the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. The described embodiments are a part rather than all of the embodiments of the present invention. All other embodiments obtained by a person of ordinary skill in the art based on the embodiments of the present invention without creative efforts shall fall within the protection scope of the present invention.

Figure 1:
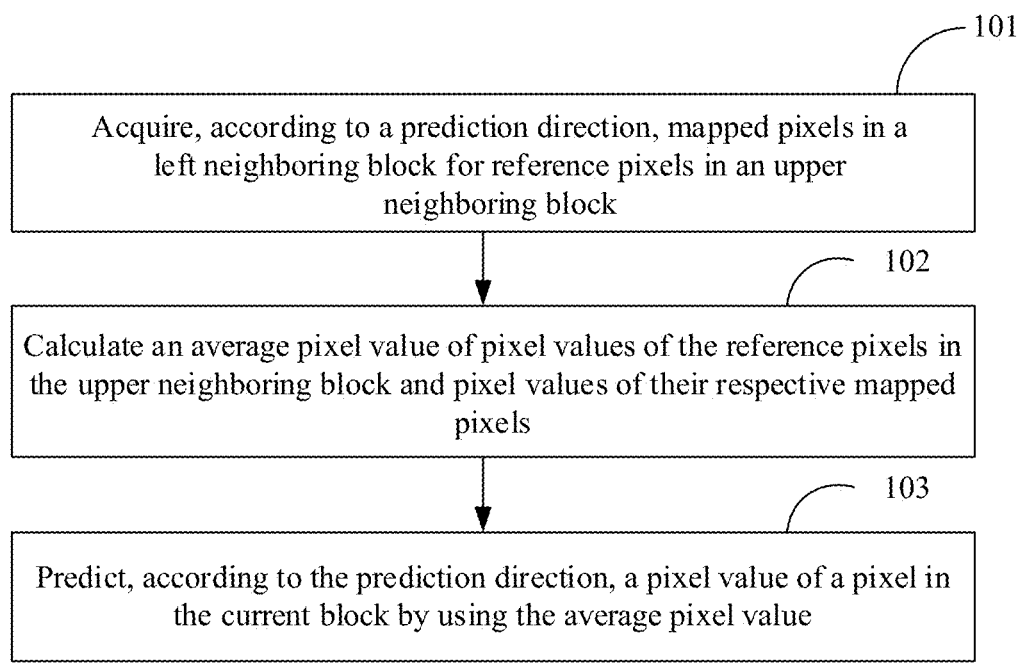
FIG. 1 is a schematic diagram of an intra-prediction method according to an embodiment of the present invention.

With reference to FIG. 1, an embodiment of the present invention provides an intra-prediction method, including:

Step 101: Acquire, according to a prediction direction, mapped pixels in a left neighboring block for reference pixels in an upper neighboring block;

Step 102: Calculate an average pixel value of pixel values of the reference pixels in the upper neighboring block and pixel values of their respective mapped pixels; and Step 103: Predict, according to the prediction direction, a pixel value of a pixel in the current block by using the average pixel value.

In this embodiment of the present invention, the predicting, according to the prediction direction, a pixel value of a pixel in the current block by using the average pixel value includes filling the average pixel value in the reference pixels separately, and predicting, according to the prediction direction and the average pixel value of the reference pixels, the pixel value of the pixel in the current block.

In this embodiment of the present invention, a method for calculating an average pixel value is averaging a pixel value of a reference pixel and a pixel value of a mapped pixel.

Figure 2:
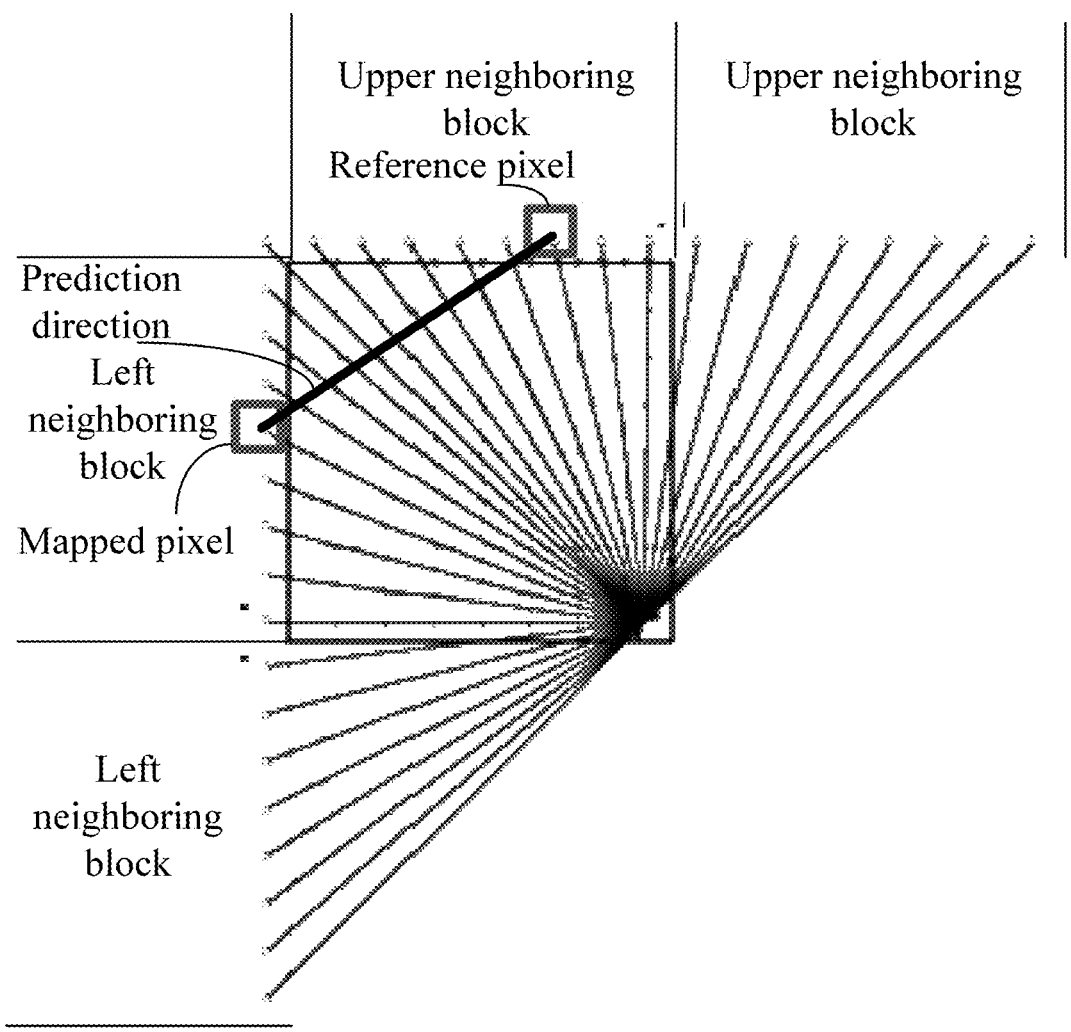
FIG. 2 is a schematic diagram illustrating application of an intra-prediction method according to an embodiment of the present invention.

With further reference to FIG. 2, in an embodiment of the present invention, a reference pixel in an upper neighboring block is a pixel that is in the upper neighboring block and close to a border of the current block, and a mapped pixel in a left neighboring block is a pixel that is in the left neighboring block and close to a border of the current block. The upper neighboring block of the current block includes a neighboring block located above the current block and a neighboring block located to the upper right of the current block, and the left neighboring block of the current block includes a neighboring block located to the left of the current block and a neighboring block located to the lower left of the current block. When prediction is performed, a reference pixel in an upper neighboring block is located according to a forward direction or a reverse direction of a current prediction direction, and then a mapped pixel that is in a left neighboring block and corresponding to each reference pixel is located along the current prediction direction. An average pixel value of a reference pixel in an upper neighboring block and a corresponding mapped pixel is obtained, and the average pixel value is filled in a reference pixel in the upper neighboring block. When each reference pixel in the upper neighboring block is filled with the average pixel value, a pixel in the current block is predicted according to the pixel value filled in each reference pixel and according to the current prediction direction.

It should be noted that, the prediction direction shown in FIG. 2 may be from the upper neighboring block to the left neighboring block, or may be from the left neighboring block to the upper neighboring block.

It should be noted that, in this embodiment of the present invention, upper neighboring blocks of the current block include a neighboring block located above the current block and a neighboring block located to the upper right of the current block. This block partitioning structure, however, is based on a codec sequence from left to right and from up to bottom, and does not take optional prediction directions defined in various standards into consideration. If the codec sequence is changed or a new prediction direction is added, the upper neighboring blocks of the current block are changed accordingly, for example, a neighboring block located to the upper left of the current block is included Likewise, left neighboring blocks of the current block may also vary with a codec sequence or a prediction direction, for example, a neighboring block located to the upper left of the current block is included.

It should further be noted that, when a current prediction direction is 45 degrees (from lower left to upper right) or 225 degrees (from upper right to lower left), a mapped pixel, in the left neighboring block, of each reference pixel in the upper neighboring block is an integer pixel, and at this time, a pixel value of a reference pixel that is of the left neighboring block along a forward direction or a reverse direction of the prediction direction may be directly used as a pixel value of the mapped pixel. However, when the prediction direction is not 45 degrees, a deviation in prediction direction may occur during acquiring of a mapped pixel according to the prediction direction, the mapped pixel is not exactly located in a position of an integer pixel in the neighboring block, that is, the mapped pixel is a sub-pixel, and at this time, a pixel value of the mapped pixel may be obtained, through interpolation and according to pixel values of a part of integer pixels around the mapped pixel.

In the intra-prediction method according to the embodiments of the present invention, a pixel value of a reference pixel used for prediction is obtained according to an average pixel value of reference pixels in an upper neighboring block and a left neighboring block of the current block, so that a spatial distribution feature of a pixel is fully considered, and a better prediction effect compared with the prior art is achieved.

Figure 3:
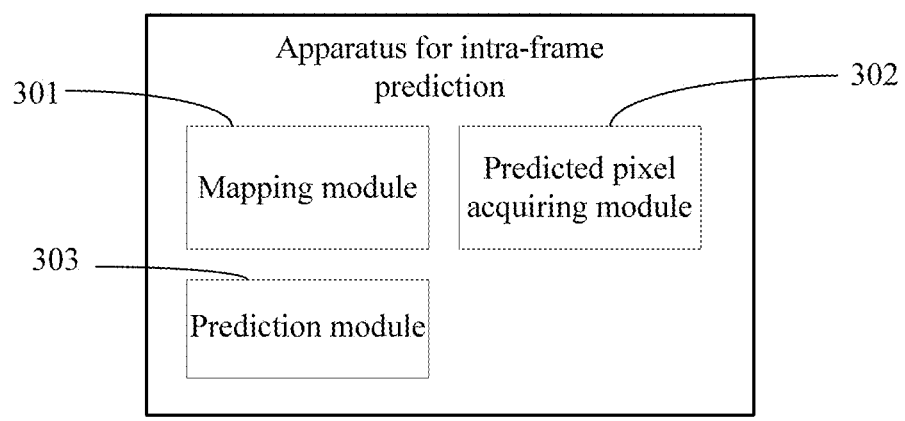
FIG. 3 is a schematic diagram of an intra-prediction apparatus according to an embodiment of the present invention.

With reference to FIG. 3, FIG. 3 is a schematic diagram of an intra-prediction apparatus according to an embodiment of the present invention, where the apparatus is used to execute the intra-prediction method provided in the embodiments of the present invention. The intra-prediction apparatus includes: a mapping module 301 configured to acquire, according to a prediction direction, mapped pixels in a left neighboring block for reference pixels in an upper neighboring block; a predicted pixel acquiring module 302 configured to calculate an average pixel value of pixel values of the reference pixels in the upper neighboring block and pixel values of their respective mapped pixels; and a prediction module 303 configured to predict, according to the prediction direction, a pixel value of a pixel in the current block by using the average pixel value.

In this embodiment of the present invention, the prediction module 303 fills the average pixel value in the reference pixels separately and then predicts, according to the prediction direction and the average pixel value of the reference pixels, the pixel value of the pixel in the current block.

Specifically, the prediction module includes a filling submodule configured to fill the average pixel value in the reference pixels separately, and a prediction submodule configured to predict, according to the prediction direction and the average pixel value of the reference pixels, the pixel value of the pixel in the current block.

In this embodiment of the present invention, a method for calculating an average pixel value is averaging a pixel value of a reference pixel and a pixel value of a mapped pixel.

A person of ordinary skill in the art may be aware that, in combination with the examples described in the embodiments disclosed in this specification, units and algorithm steps may be implemented by electronic hardware, computer software, or a combination thereof. In order to clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to an actual need to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, a network device, or the like) to perform all or a part of the steps of the methods described in the embodiments of the present invention. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An intra-prediction method, used to predict pixel values of a plurality of pixels in a current block according to pixel values of an upper neighboring block and a left neighboring block, comprising:
   acquiring, according to a predefined prediction direction, a mapped pixel in a left neighboring block for a reference pixel in an upper neighboring block, wherein the mapped pixel has a mapped pixel value and the reference pixel has a reference pixel value;
   calculating an average pixel value of the reference pixel value and the mapped pixel value; and
   predicting, according to the prediction direction, pixel values of the plurality of pixels in the current block using the average pixel value, wherein the plurality of pixels in the current block are those pixels that are intersected by a line between the reference pixel and the mapped pixel.

2. The intra-prediction method according to claim 1, wherein a forward direction or a reverse direction of the prediction direction points from the reference pixel to the mapped pixel.

3. The intra-prediction method according to claim 1, wherein predicting, according to the prediction direction, the pixel values of the plurality of pixels in the current block using the average pixel value comprises:
   filling the average pixel value into the reference pixel separately; and
   predicting, according to the prediction direction and the pixel value of the reference pixel, the pixel values of the plurality of pixels in the current block.

4. The intra-prediction method according to claim 3, wherein predicting, according to the prediction direction, the pixel values of the plurality of pixels in the current block using the average pixel value is performed after the reference pixel is filled with the average pixel value.

5. The intra-prediction method according to claim 1, wherein the upper neighboring block of the current block comprises a neighboring block located above the current block and a neighboring block located to the upper right of the current block, and wherein the left neighboring block of the current block comprises a neighboring block located to the left of the current block and a neighboring block located to the lower left of the current block.

6. The intra-prediction method according to claim 1, wherein after the average pixel value of the reference pixel and the mapped pixel is calculated, the pixel values of the plurality of pixels in the current block are then predicted according to the prediction direction using the average pixel value.

7. The intra-prediction method according to claim 1, wherein the reference pixel is adjacent to a top border of the current block, and wherein the mapped pixel is adjacent to a left border of the current block.

8. The intra-prediction method according to claim 1, wherein when the mapped pixel is a sub-pixel, the method further comprises acquiring, through interpolation and according to pixel values of a part of integer pixels adjacent to the sub-pixel, the pixel value of the mapped pixel.

9. An intra-prediction apparatus, comprising;
   a memory containing a plurality of blocks of pixels of an image age frame, wherein the plurality of blocks comprises a current block, an upper neighboring block of the current block, and a left neighboring block of the current block; and
   a processor coupled to the memory and configured to:
      acquire according to a predefined prediction direction, a mapped pixel in the left neighboring block for a reference pixel in the upper neighboring block;
      calculate an average pixel value of a pixel value of the reference pixel and a pixel value of the mapped pixel; and
      predict, according to the prediction direction, pixel values of a plurality of pixels in the current block using the average pixel value, wherein the plurality of pixels in the current block are those pixels that intersected by a line between the reference pixel and the mapped pixel.

10. The intra-prediction apparatus according to claim 9, wherein a forward direction or a reverse direction of the prediction direction points from the reference pixel to the mapped pixel.

11. The intra-prediction apparatus according to claim 9, wherein the processor is further configured to:
fill the average pixel value into the reference pixel; and
predict, according to the prediction direction and the pixel value of the reference pixel, the pixel values of the plurality of pixels in the current block.

12. The intra-prediction apparatus according to claim 11, wherein the processor is further configured to predict the pixel values of the plurality of pixels in the current block after the processor fills the average pixel value into the reference pixel.

13. The intra-prediction apparatus according to claim 9, wherein the upper neighboring block of the current block comprises a neighboring block located above the current block and a neighboring block located to the upper right of the current block, and wherein the left neighboring block of the current block comprises a neighboring block located to the left of the current block and a neighboring block located to the lower left of the current block.

14. The intra-prediction apparatus according to claim 9, wherein after the processor calculates the average pixel value, the processor is further configured to predict, according to the prediction direction, the pixel values, of the plurality of pixels in the current block using the average pixel value.

15. The intra-prediction apparatus according to claim 9, wherein the reference pixel is adjacent to a top border of the current block, and wherein the mapped pixel is adjacent to a left border of the current block.

16. The intra-prediction apparatus according to claim 9, wherein the mapped pixel is a sub-pixel, the processor is further configured to acquire, through interpolation and according to pixel values of a part of integer pixels adjacent to the sub-pixel, the pixel values of the mapped pixel.

17. The intra-prediction method according to claim 1, wherein the upper neighboring block comprises a second reference pixel, and wherein the method farther comprises:
acquiring, according to a prediction direction, a second mapped pixel in the left neighboring, block;
calculating a second average pixel value of a value of the second reference pixel and a value of the second mapped pixel; and
predicting pixel values of a second plurality of pixels in the current block according to the prediction direction and the second average pixel value, wherein the second plurality of pixels in the current block are those pixels that are intersected by a line between the second reference pixel and the second mapped pixel.

18. The intra-prediction apparatus according to claim 9, wherein the upper neighboring block comprises a second reference pixel, and wherein the processor is further configured to:
acquire, according to a prediction direction, a second mapped pixel in the left neighboring block;
calculate a second average pixel value of a value of the second reference pixel and a value of the second mapped pixel; and
predict pixel values of a second plurality of pixels in the current block according to the prediction direction and the second average pixel value, wherein the second plurality of pixels in the current block are those pixels that are intersected by a line between the second reference pixel and the second mapped pixel.

* * * * *